(12) United States Patent
Inoue et al.

(10) Patent No.: US 9,368,138 B2
(45) Date of Patent: Jun. 14, 2016

(54) DISK DRIVE SUSPENSION

(71) Applicant: NHK SPRING CO., LTD., Yokohama-shi, Kanagawa (JP)

(72) Inventors: Masaru Inoue, Aiko-gun (JP); Sei Kawao, Aiko-gun (JP); Rintarou Niwa, Aiko-gun (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 13 days.

(21) Appl. No.: 14/272,398

(22) Filed: May 7, 2014

(65) Prior Publication Data
US 2014/0368954 A1 Dec. 18, 2014

(30) Foreign Application Priority Data

Jun. 14, 2013 (JP) ................................. 2013-125615

(51) Int. Cl.
*G11B 5/48* (2006.01)

(52) U.S. Cl.
CPC ............ *G11B 5/4826* (2013.01); *G11B 5/4853* (2013.01); *G11B 5/486* (2013.01); *G11B 5/4873* (2013.01)

(58) Field of Classification Search
None
See application file for complete search history.

(56) References Cited

U.S. PATENT DOCUMENTS

| 6,731,472 | B2 * | 5/2004 | Okamoto | G11B 21/16 360/244.5 |
| 8,179,745 | B2 | 5/2012 | Nakamura et al. | |
| 8,699,186 | B1 * | 4/2014 | Hahn | G11B 5/4873 360/244.9 |
| 2005/0248885 | A1 * | 11/2005 | Funada | G11B 5/6005 360/245.9 |
| 2011/0096438 | A1 | 4/2011 | Takada et al. | |
| 2011/0279929 | A1 * | 11/2011 | Kin | G11B 5/4853 360/294.4 |

FOREIGN PATENT DOCUMENTS

| JP | 2002-050140 A | 2/2002 |
| JP | 2010-146631 A | 7/2010 |
| JP | 2010-218626 A | 9/2010 |

* cited by examiner

*Primary Examiner* — Carlos E Garcia
(74) *Attorney, Agent, or Firm* — Holtz, Holtz & Volek PC

(57) ABSTRACT

In a first terminal portion, a first conductor, a terminal element as a first protection, and a first gold-plating layer are provided. The first terminal element is thicker than a base nickel layer of a slider terminal portion. The first gold-plating layer is provided with a first roughening processed portion. An electrically conductive paste contacts the roughening processed portion. In a second terminal portion, a second conductor, a terminal element as a second protection, and a second gold-plating layer are provided. The second terminal element is thicker than the base nickel layer. The second gold-plating layer is provided with a second roughening processed portion. An electrically conductive paste contacts the second roughening processed portion.

12 Claims, 14 Drawing Sheets

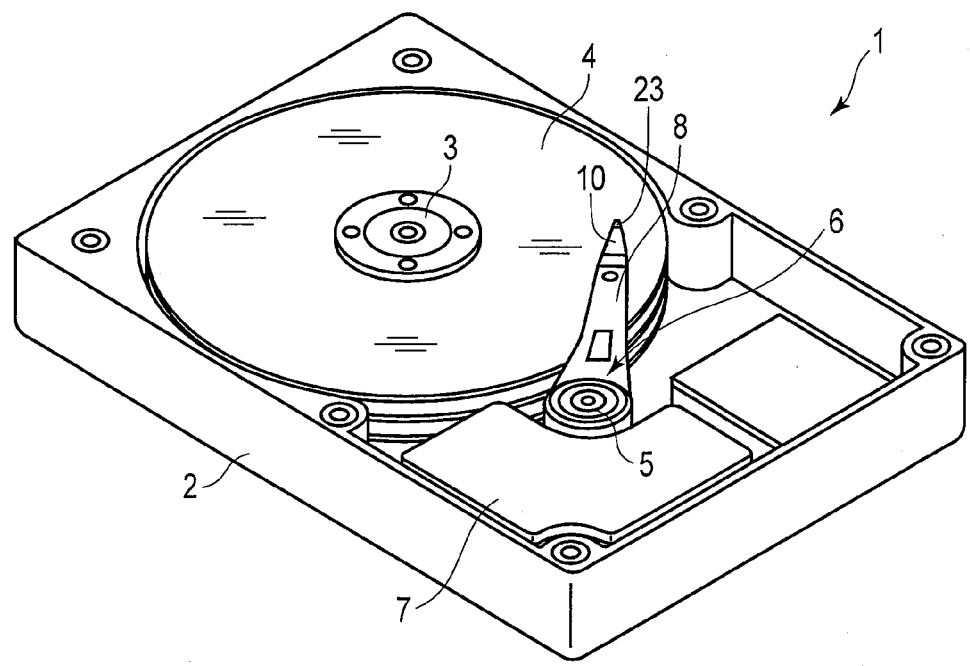
F I G. 1
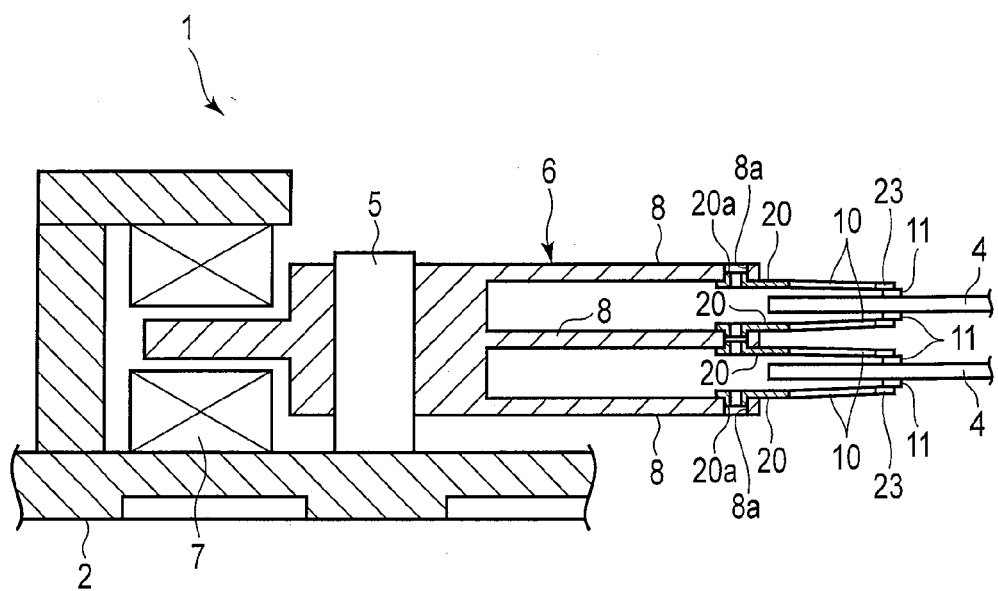
F I G. 2

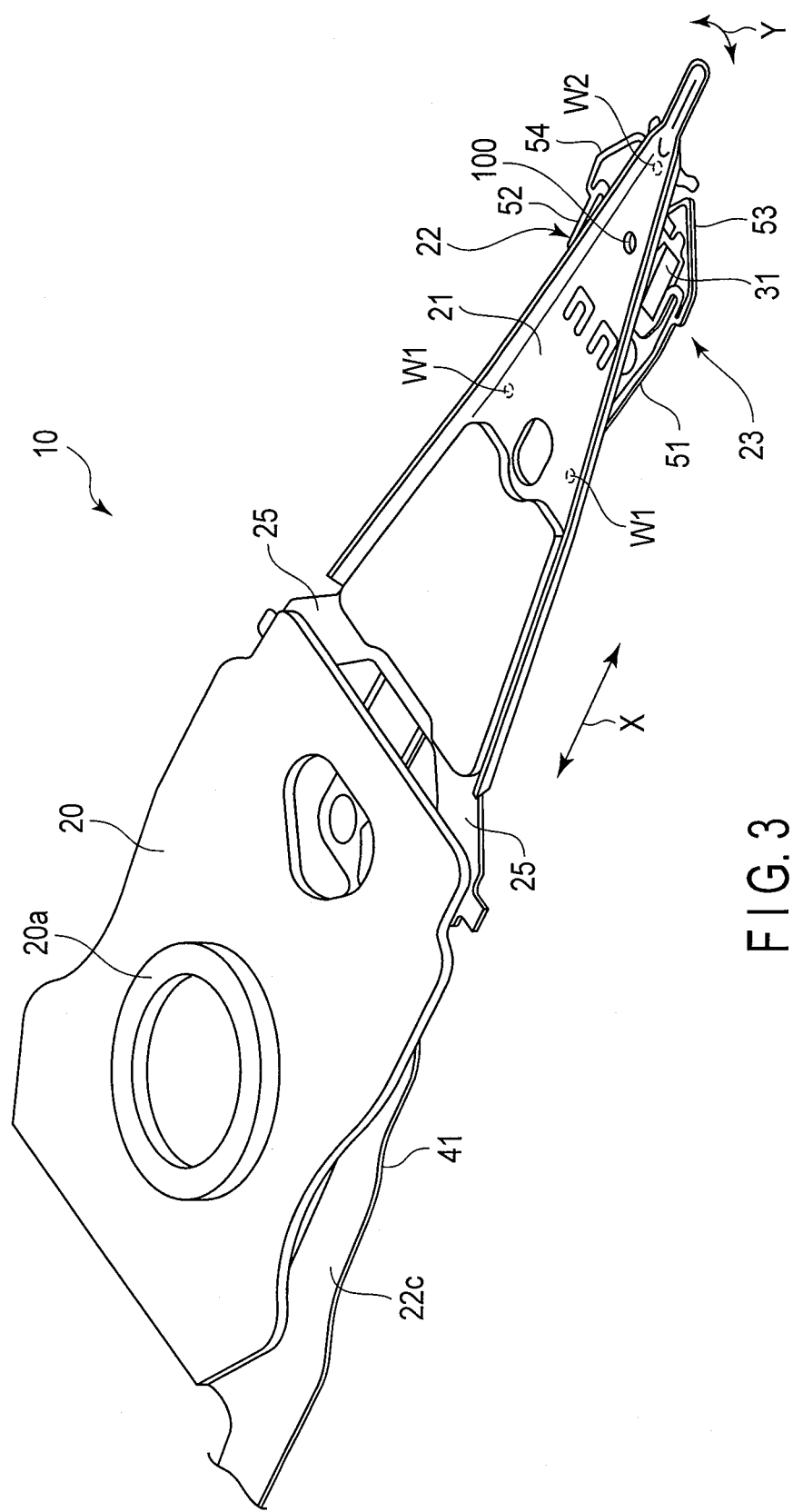
F I G. 3

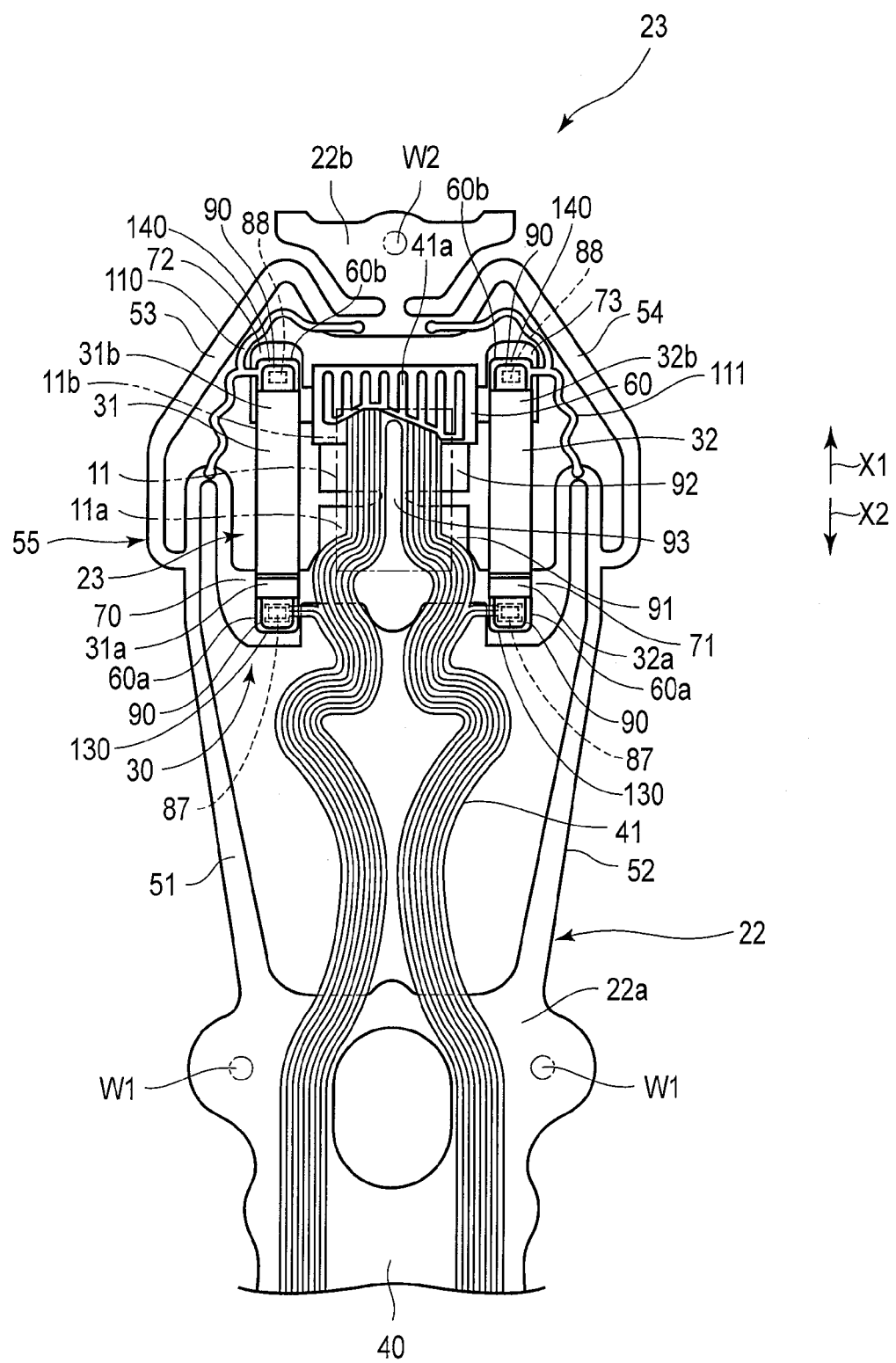
F I G. 6

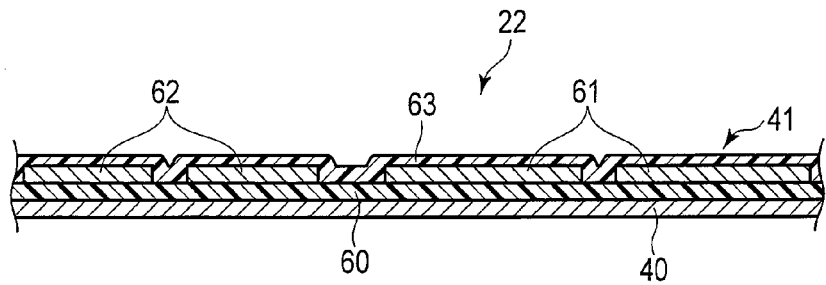
F I G. 7
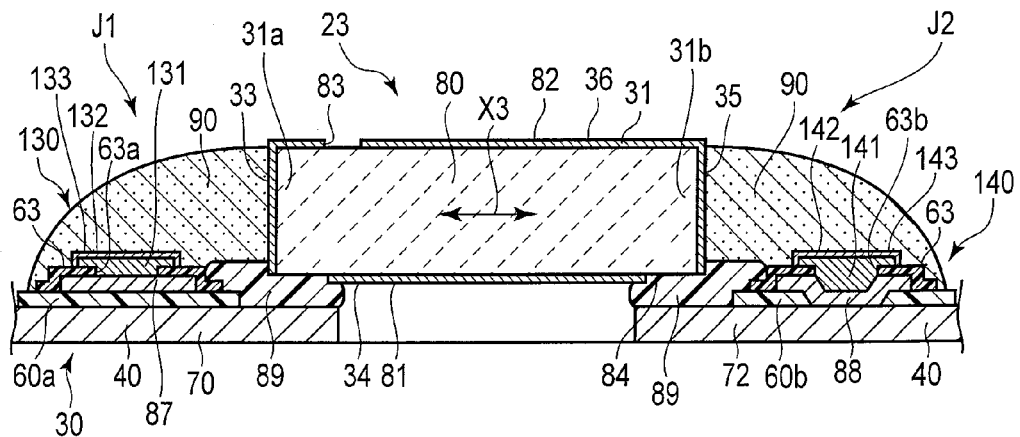
F I G. 8
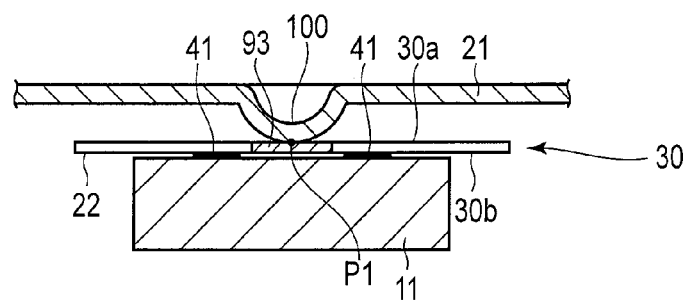
F I G. 9

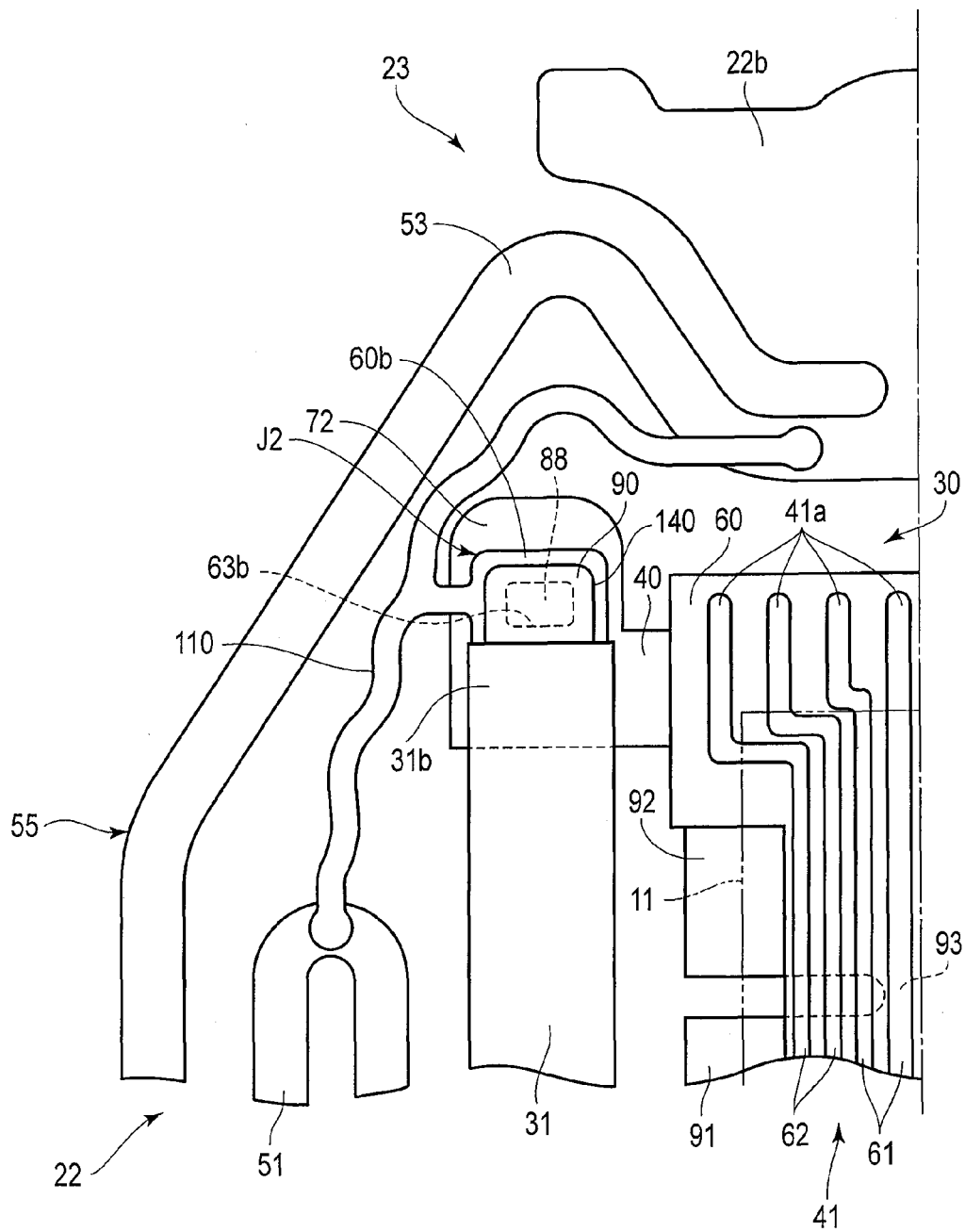
F I G. 11

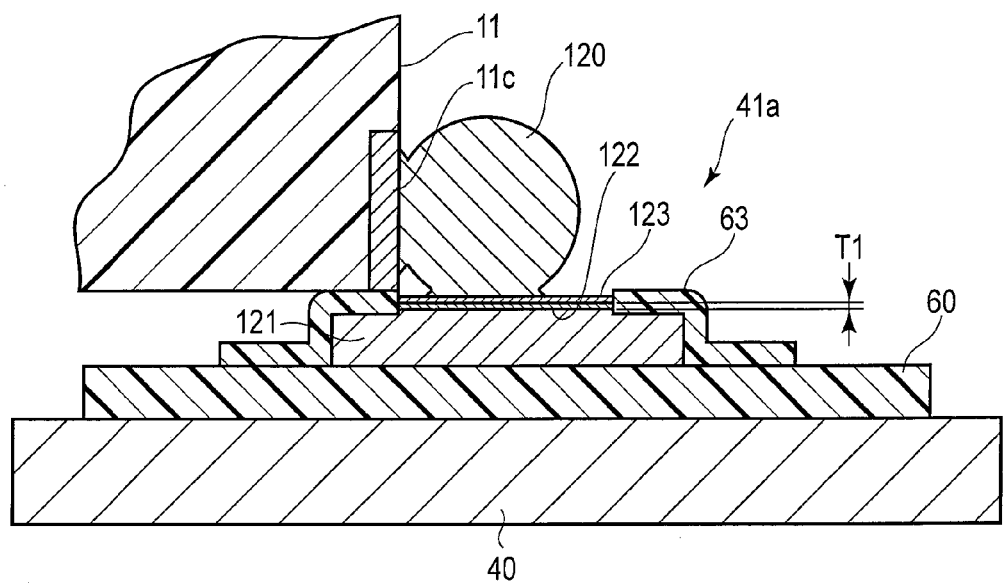
F I G. 12
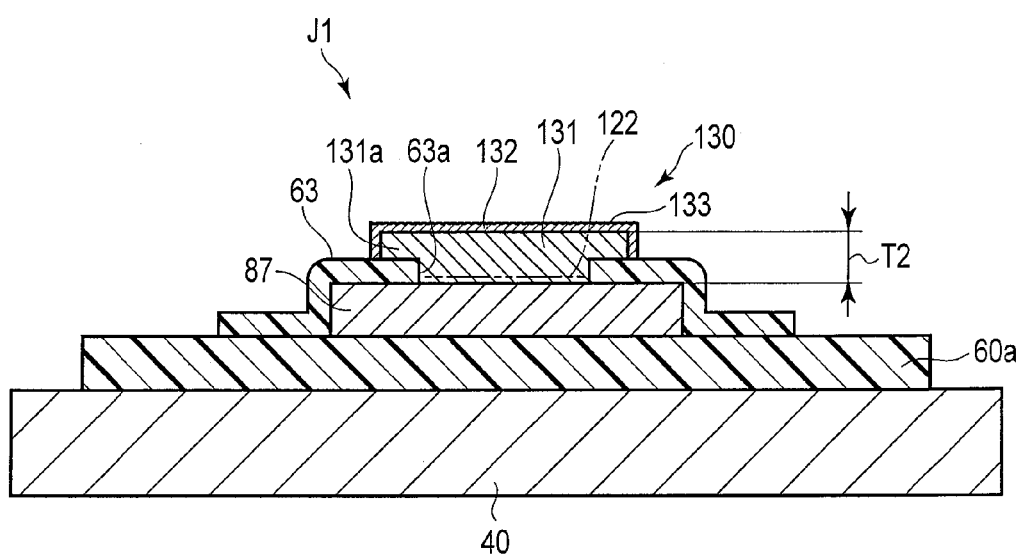
F I G. 13

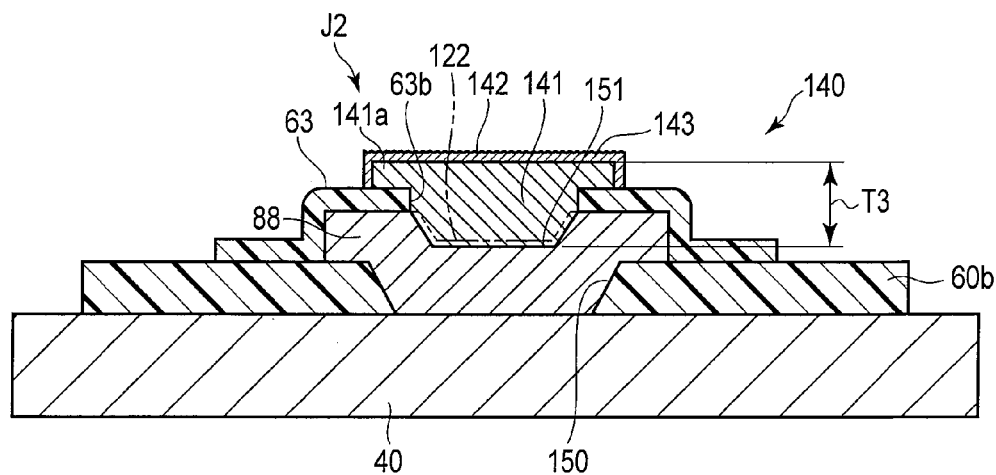
F I G. 14
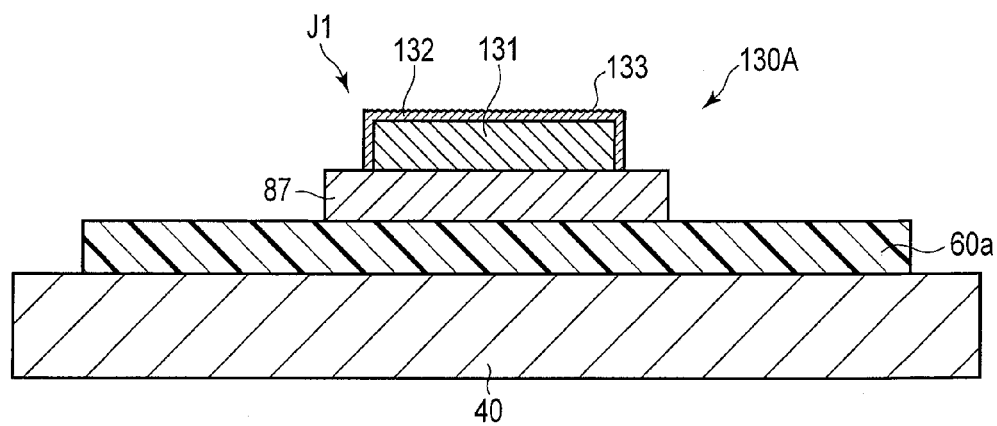
F I G. 15

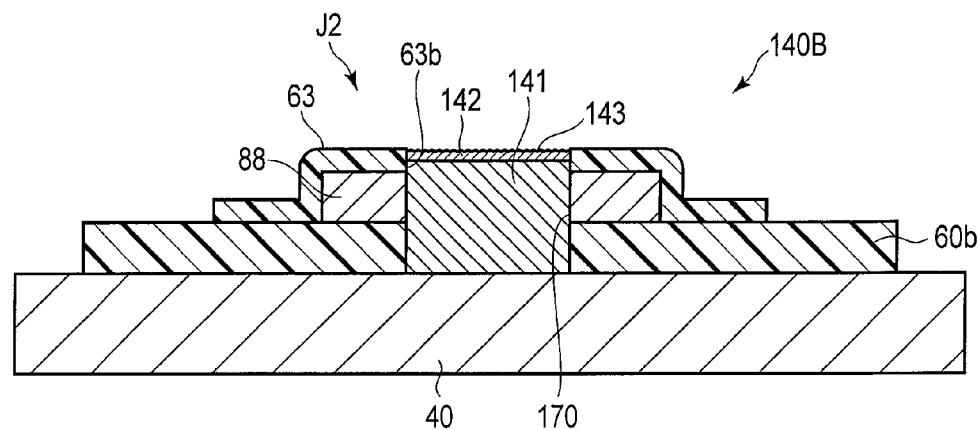
F I G. 20
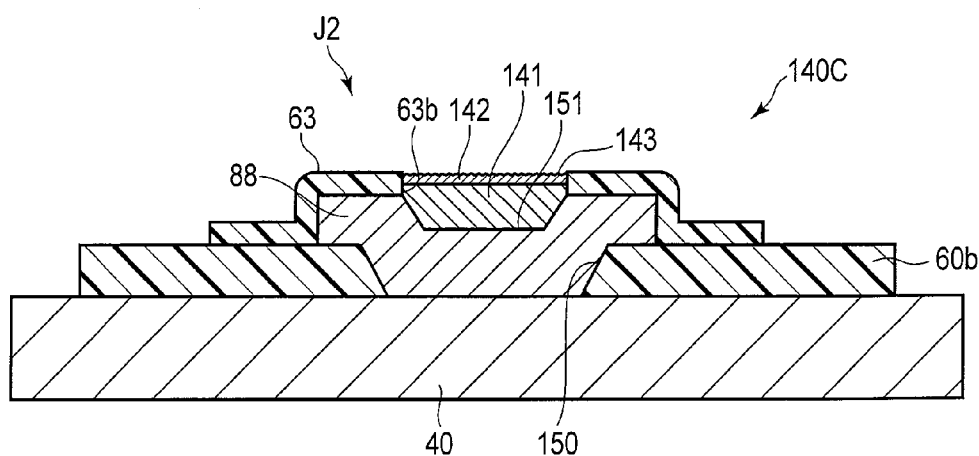
F I G. 21

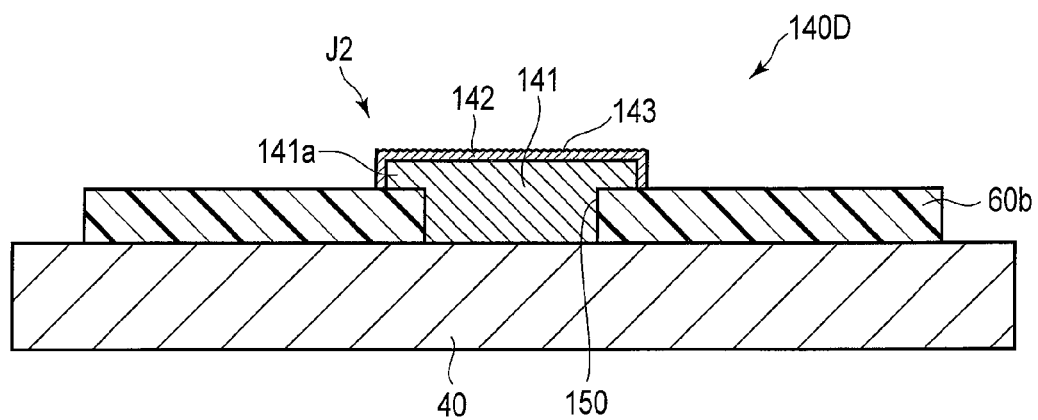
F I G. 22
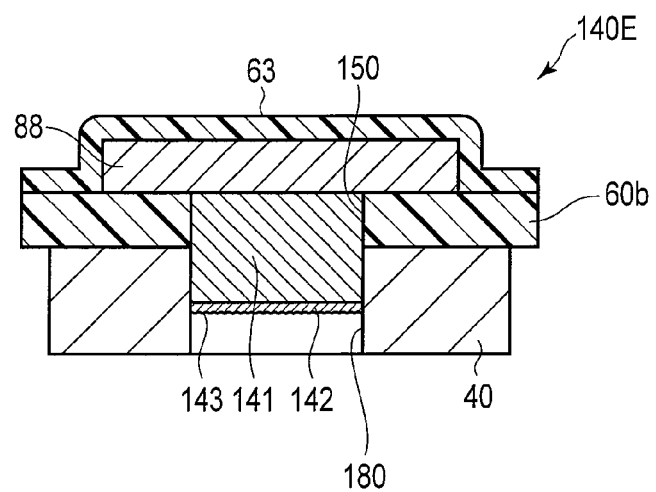
F I G. 23

DISK DRIVE SUSPENSION

CROSS-REFERENCE TO RELATED APPLICATIONS

This application is based upon and claims the benefit of priority from prior Japanese Patent Application No. 2013-125615, filed Jun. 14, 2013, the entire contents of which are incorporated herein by reference.

BACKGROUND OF THE INVENTION

1. Field of the Invention

This invention relates to a disk drive suspension comprising an actuator element.

2. Description of the Related Art

A hard disk drive (HDD) is used in an information processor such as a personal computer. The HDD comprises a magnetic disk rotatable about a spindle, a carriage turnable about a pivot, etc. The carriage comprises an actuator arm, and is configured to be turned transversely relative to tracks of the disk about the pivot by a positioning motor such as a voice coil motor.

A suspension is mounted on the actuator arm. The suspension comprises a load beam, and a flexure disposed to overlap the load beam. A slider, which constitutes a magnetic head, is mounted on a gimbal portion formed near a distal end of the flexure. The slider is provided with an element (transducer) for accessing data, that is, for reading or writing of data.

In order to deal with increased recording density of disks, it is necessary to position the magnetic head with higher precision with respect to the recording surface of the disk. In order to achieve this, as disclosed in Jpn. Pat. Appln. KOKAI Publication No. 2002-50140 (Patent Document 1), dual-stage-actuator (DSA) suspensions, which use positioning motors (voice coil motors) together with actuator elements made of a piezoelectric material such as lead zirconate titanate (PZT), have been developed. With the DSA suspension, it is possible to quickly move a distal end of the suspension by an infinitesimal distance in a sway direction (or transversely relative to tracks) by applying a voltage to the actuator elements and thereby deforming the actuator elements. The actuator elements are disposed on an actuator mounting section provided in the suspension.

The element made of the piezoelectric material has a plate-like configuration, and is provided with an electrode on a surface at one side in a thickness direction and another electrode on a surface at the other side. The electrode on one side is electrically connected to a metallic plate via an electrically conductive paste, such as a silver paste. The electrode on the other side is connected to an interconnect member of a flexure via a conductive member, such as a bonding wire. As has been disclosed in Jpn. Pat. Appln. KOKAI Publication No. 2010-146631 (Patent Document 2) and Jpn. Pat. Appln. KOKAI Publication No. 2010-218626 (Patent Document 3), DSA suspensions having an actuator element made of PZT, etc., mounted on a gimbal portion of a flexure are known.

At a terminal portion of the actuator element, a gold-plating layer is formed to improve conductivity with the electrically conductive paste. However, since gold is an inactive metal, adherence to the electrically conductive paste is not good. Accordingly, in a place where the gold-plating layer is provided, peel strength between the electrically conductive paste and the terminal portion may be weakened. For example, when a continuity test was conducted in high-temperature and high-humidity atmosphere, there were cases where electrical resistance between the terminal portion and the electrically conductive paste was increased, causing poor electrical connection to the actuator element. Thus, some came up with an idea of forming a roughening processed portion including a number of pits and projections on a surface of the gold-plating layer.

However, in a suspension comprising extremely small actuator elements, it has been found that the roughening treatment performed on a surface of the gold-plating layer sometimes adversely affects the adherence of the electrically conductive paste to the gold-plating layer in the terminal portion on the contrary. The reason for this has been studied intensely and the following is found out:

When an extremely small actuator is used, the terminal portion of the actuator element is extremely small, so that the thickness of a base nickel layer used as the base of the gold plating is also small. For this reason, when the power of the laser beam is too strong in performing the roughening treatment on the gold-plating layer or etching is excessive in performing the roughening treatment by etching, the base nickel layer is coarsened or a hole is formed, thereby exposing copper of a conductor in some cases. When the copper of the conductor is exposed, the copper surface is oxidized, which causes deterioration of wettability for the electrically conductive paste.

BRIEF SUMMARY OF THE INVENTION

Accordingly, an object of the present invention is to provide a disk drive suspension which can prevent deterioration of wettability of an electrically conductive paste with respect to a gold-plating layer having a roughening processed portion, and reliably achieve securing of the electrically conductive paste to a terminal portion and electrical connection therebetween.

According to one embodiment, a disk drive suspension comprises a load beam, a flexure comprising a metal base secured to the load beam and a slider mounted thereon, actuator elements configured to displace the slider, a slider terminal portion which is electrically connected to a terminal of the slider, a first terminal portion which is electrically connected to a first electrode of the actuator elements via an electrically conductive paste, and a second terminal portion which is electrically connected to a second electrode of the actuator elements via an electrically conductive paste, wherein the slider terminal portion comprises a terminal conductor made of copper, a base nickel layer formed on the terminal conductor, and a gold-plating layer formed on the base nickel layer. The first terminal portion comprises a first insulating layer having an electrical insulating property provided on the metal base, a first conductor made of copper which is formed on the first insulating layer, a first terminal element made of nickel which is provided on the first conductor and has a thickness greater than the base nickel layer, and a first gold-plating layer which is formed on the first terminal element and comprises a first roughening processed portion on its surface, and the first terminal element disposed between the first roughening processed portion and the first conductor constitutes a first protection means for preventing a part of copper of the first conductor from being exposed to the first roughening processed portion.

According to the structure of this embodiment, even if the gold-plating layer is coarsened or a hole is formed in forming the roughening processed portion on the gold-plating layer, the terminal element can prevent copper of the conductor from being exposed. Accordingly, it is possible to prevent deterioration of the wettability due to oxidization, etc., of the conductor of the terminal portion, and increase peel strength of the electrically conductive paste with respect to the terminal portion.

The second terminal portion comprises a second insulating layer having an electrical insulating property provided on the metal base, a second conductor made of copper which is formed on the second insulating layer, a second terminal element made of nickel which is provided on the second conductor and has a thickness greater than the base nickel layer, and a second gold-plating layer which is formed on the second terminal element and comprises a second roughening processed portion on its surface, and the second terminal element disposed between the second roughening processed portion and the second conductor constitutes a second protection means for preventing a part of copper of the second conductor from being exposed to the second roughening processed portion.

In one embodiment, the first terminal portion may comprise a cover layer having an electrical insulating property which covers the first conductor, and the first terminal element and the first gold-plating layer comprising the first roughening processed portion may be provided at an interior of an opening formed in the cover layer. Alternatively, the second terminal portion may comprise a cover layer having an electrical insulating property which covers the second conductor, and the second terminal element and the second gold-plating layer comprising the second roughening processed portion may be provided at an interior of an opening formed in the cover layer.

According to another embodiment, the first terminal portion may comprise a cover layer having an electrical insulating property which covers the first conductor, and the first terminal portion may comprise the first terminal element in an opening formed in the cover layer, and include an overhang portion which protrudes outwardly from the opening at a part of the first terminal element. Alternatively, the second terminal portion may comprise a cover layer having an electrical insulating property which covers the second conductor, and the second terminal portion may comprise the second terminal element in an opening formed in the cover layer, and include an overhang portion which protrudes outwardly from the opening at a part of the second terminal element. Further, the second insulating layer may comprise an opening, and the second conductor may contact the metal base such that a part of the second conductor is confined within the opening.

The first conductor may comprise a recess so that the recess may accommodate a part of the first terminal element, or the second conductor may comprise a recess so that the recess accommodates a part of the second terminal element. The first insulating layer may comprise a recess, and the recess may accommodate a part of the first conductor. Alternatively, a through-hole may be formed at a place extending through the second insulating layer and the second conductor to accommodate the second terminal element therein, and the second terminal element may contact the metal base.

A base nickel layer, which is the layer of the same material as the base nickel layer of the slider terminal portion, may overlap the first terminal element in a thickness direction thereof, or a base nickel layer, which is the layer of the same material as the base nickel layer of the slider terminal portion, may overlap the second terminal element in a thickness direction thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing an example of a disk drive;

FIG. 2 is a partial cross-sectional view of the disk drive shown in FIG. 1;

FIG. 3 is a perspective view of a suspension according to a first embodiment;

FIG. 6 is a plan view of the actuator mounting section of FIG. 4;

FIG. 7 is a partial cross-sectional view of a conductive circuit portion of a flexure of the suspension;

FIG. 8 is a cross-sectional view of the actuator mounting section of FIG. 4;

FIG. 9 is a cross-sectional view showing a part of a load beam and the flexure;

FIG. 11 is a plan view showing a second joint portion of the actuator mounting section of FIG. 4;

FIG. 12 is a cross-sectional view showing a slider terminal portion of the actuator mounting section of FIG. 4;

FIG. 13 is a cross-sectional view of a first terminal portion of the actuator mounting section of FIG. 4;

FIG. 14 is a cross-sectional view of a second terminal portion of the actuator mounting section of FIG. 4;

FIG. 15 is a cross-sectional view of a first terminal portion of an actuator mounting section according to a second embodiment;

FIG. 20 is a cross-sectional view of a second terminal portion of an actuator mounting section according to a seventh embodiment;

FIG. 21 is a cross-sectional view of a second terminal portion of an actuator mounting section according to an eighth embodiment;

FIG. 22 is a cross-sectional view of a second terminal portion of an actuator mounting section according to a ninth embodiment; and FIG. 23 is a cross-sectional view of a second terminal portion of an actuator mounting section according to a tenth embodiment.

DETAILED DESCRIPTION OF THE INVENTION

Figure 4:
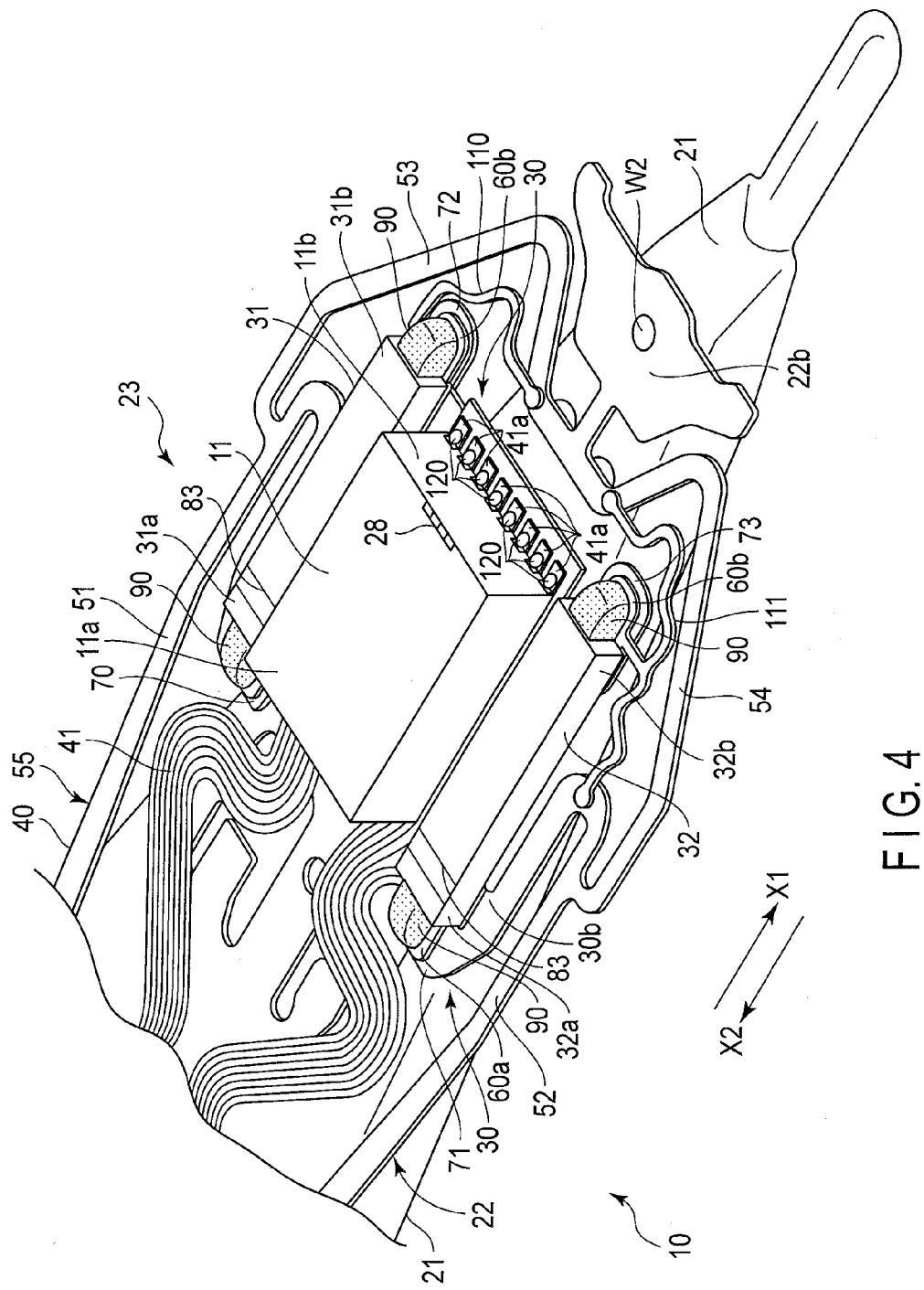
FIG. 4 is a perspective view of an actuator mounting section of the suspension of FIG. 3 when seen from a slider side.

A disk drive suspension according to a first embodiment of the present invention will now be described with reference to FIGS. 1 to 14.

A disk drive (HDD) 1 shown in FIG. 1 comprises a case 2, disks 4 rotatable about a spindle 3, a carriage 6 turnable about a pivot 5, and a positioning motor (voice coil motor) 7 for actuating the carriage 6, etc. The case 2 is sealed by a lid which is not shown.

FIG. 2 is a cross-sectional view schematically showing a part of the disk drive 1. As shown in FIGS. 1 and 2, the carriage 6 is provided with arms (carriage arms) 8. At a distal end portion of each arm 8, a suspension 10 is mounted. At a distal end portion of the suspension 10, a slider 11 which constitutes a magnetic head is provided. When each disk 4 rotates at high speed, an air bearing is formed between the disk 4 and the slider 11 as air flows in between the disk 4 and the slider 11. If the carriage 6 is turned by the positioning motor 7, the suspension 10 moves radially relative to the disk 4. In this way, the slider 11 moves to a desired track of the disk 4.

FIG. 3 shows the suspension 10 of the dual-stage-actuator (DSA) type. The suspension 10 comprises a baseplate 20 secured to its corresponding arm 8 (FIGS. 1 and 2) of the carriage 6, a load beam 21, a flexure 22 with conductors, an actuator mounting section 23 located near a distal end of the suspension 10, etc. A boss portion 20a to be inserted into a hole 8a (FIG. 2) formed in each arm 8 is formed on the baseplate 20.

A direction indicated by arrow X in FIG. 3 is a longitudinal direction of the load beam 21, that is, the longitudinal direction (front-rear direction) of the suspension 10. Arrow Y indicates a sway direction (i.e., a lateral direction of the slider 11). On a proximal portion (rear end portion) of the load beam 21, spring portions 25 which can perform thicknesswise springy deformation are formed. The flexure 22 is arranged along the load beam 21.

FIG. 4 is a perspective view of the actuator mounting section 23 when seen from the side of the slider 11. The actuator mounting section 23 is arranged at the distal end portion of the suspension 10. At an end of the slider 11 which constitutes the magnetic head, elements 28, such as magnetoresistive (MR) elements, capable of performing conversion between magnetic and electrical signals are provided. By these elements 28, access such as writing or reading of data on and from the disk 4 is performed. The slider 11, the load beam 21, the flexure 22, and the like constitute a head gimbal assembly.

The actuator mounting section 23 includes a gimbal portion 30 formed at a distal end portion of the flexure 22, and a pair of actuator elements 31 and 32. The actuator elements 31 and 32 are disposed individually on the opposite sides of the slider 11 in the gimbal portion 30. Each of the actuator elements 31 and 32 is formed of a piezoelectric plate of PZT or the like, and has the function of pivoting the slider 11 in the sway direction.

Figure 5:
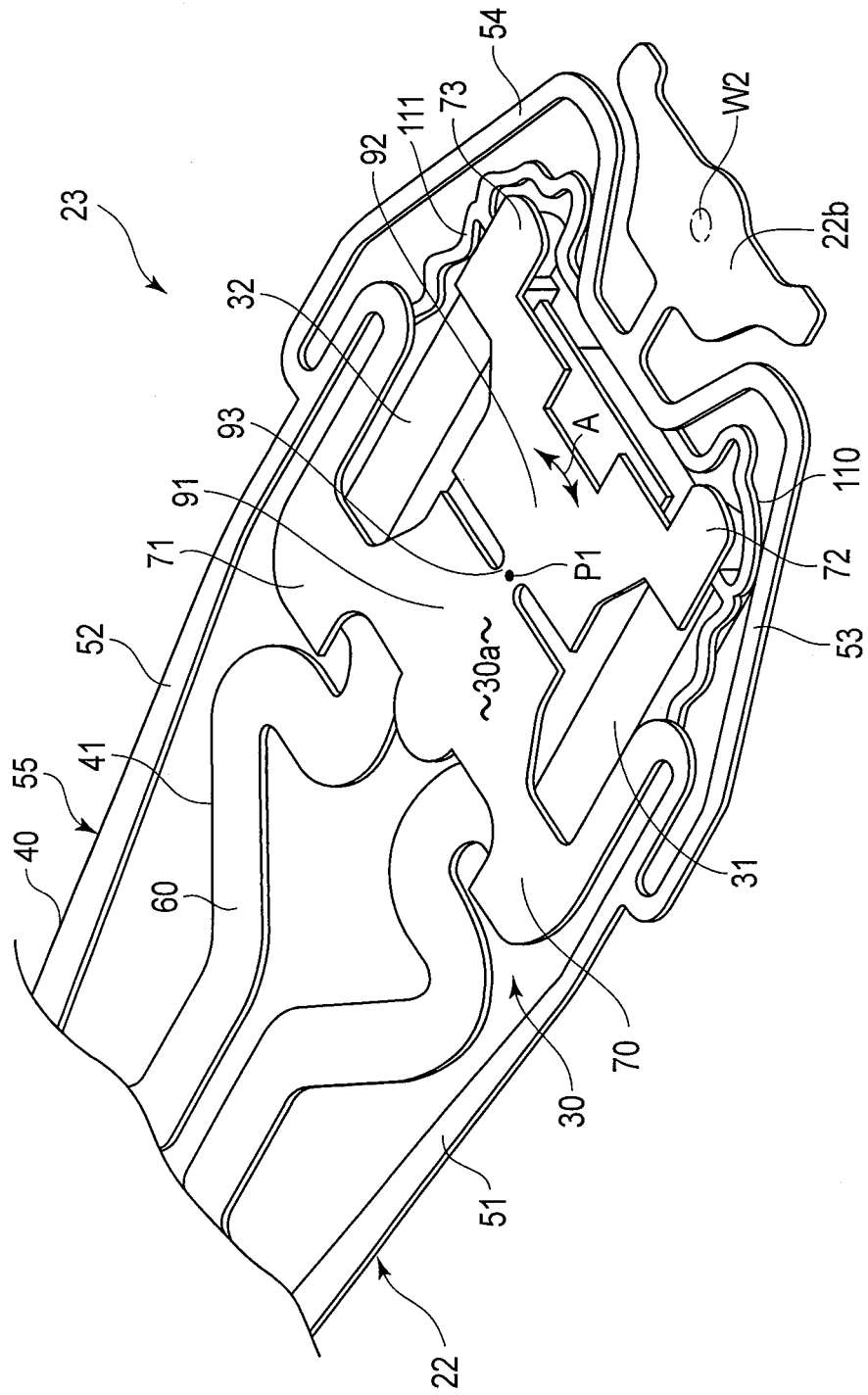
FIG. 5 is a perspective view of the actuator mounting section of FIG. 4 when seen from a tongue side.

FIG. 5 is a perspective view of the gimbal portion 30 and the actuator elements 31 and 32 when seen from the side opposite to FIG. 4. FIG. 6 is a plan view of the actuator mounting section 23 when seen from the side of the slider 11. In FIG. 6, the slider 11 is indicated by a two-dot chain line. As FIG. 8 representatively shows the actuator element 31, which is one of the actuator elements, the actuator element 31 comprises an end surface 33, a lower surface 34, another end surface 35, and an upper surface 36.

The flexure 22 comprises a metal base 40 made of a stainless-steel plate, and a conductive circuit portion 41. The conductive circuit portion 41 is disposed along the metal base 40. The conductive circuit portion 41 includes a part which overlaps the metal base 40 and a part which does not overlap the metal base 40. As shown in FIG. 6, at a distal end of the conductive circuit portion 41, a terminal for the slider 11 (slider terminal portion 41a) is provided.

The metal base 40 is secured to the load beam 21. An example of fixing means is first weld W1 (FIGS. 3 and 6) and second weld W2 (FIGS. 5 and 6) formed by laser welding. The flexure 22 comprises a first stationary part 22a and a second stationary part 22b. The first stationary part 22a is secured to the load beam 21 by weld W1 at an intermediate portion in the front-rear direction of the suspension 10. The second stationary part 22b is secured to the load beam 21 by weld W2 at a position near a distal end of the flexure 22. A rear portion 22c (FIG. 3) of the flexure 22 extends toward the back of the baseplate 20.

As shown in FIGS. 3 to 6, the metal base 40 of the flexure 22 comprises a pair of first arms 51 and 52, and a pair of second arms 53 and 54. The first arms 51 and 52 are contiguous with the first stationary part 22a, and the second arms 53 and 54 are contiguous with the second stationary part 22b. The first arms 51 and 52 and the second arms 53 and 54 constitute an arm portion 55 for elastically supporting the gimbal portion 30.

FIG. 7 shows an example of cross-sections of the metal base 40 and the conductive circuit portion 41. The conductive circuit portion 41 comprises an insulating layer 60, write conductors 61, read conductors 62, and a cover layer 63. Each of the insulating layer 60 and the cover layer 63 is made of an electrically insulating resin, such as polymide. The conductors 61 and 62 are formed on the insulating layer 60. The cover layer 63 covers the conductors 61 and 62. The write conductors 61 and the read conductors 62 are connected to the elements 28 of the slider 11. For example, the metal base 40 is 20 µm (12 to 25 µm) thick; the insulating layer 60, 10 µm (5 to 20 µm) thick; the conductors 61 and 62, 9 µm (4 to 15 µm) thick; and the cover layer 63, 5 µm (2 to 10 µm) thick. The thickness of the metal base 40 is smaller than that (for example, 30 µm) of the load beam 21.

The pair of actuator elements 31 and 32 are disposed on the gimbal portion 30 of the flexure 22. The gimbal portion 30 comprises a first surface 30a (FIGS. 5 and 9) facing the load beam 21, and a second surface 30b (FIGS. 4 and 9) which is opposite to the first surface 30a. On the second surface 30b, the slider 11 and the actuator elements 31 and 32 are disposed.

The actuator elements 31 and 32 comprise first end portions 31a and 32a, and second end portions 31b and 32b, respectively. Arrow X1 shown in FIGS. 4 and 6 indicates a forward direction of the actuator elements 31 and 32, and arrow X2 indicates a rearward direction of the same. The first end portions 31a and 32a of the actuator elements 31 and 32 are secured to a pair of first supporting portions 70 and 71 formed on the gimbal portion 30, respectively. The first supporting portions 70 and 71 connect with the first stationary part 22a of the flexure 22 through the flexible first arms 51 and 52, respectively. The second end portions 31b and 32b of the actuator elements 31 and 32 are secured to a pair of second supporting portions 72 and 73 formed on the gimbal portion 30, respectively.

Since the structures of the actuator elements 31 and 32 are common to each other, one of the actuator elements, i.e., the actuator element 31, will be described as a typical example thereof.

Figure 10:
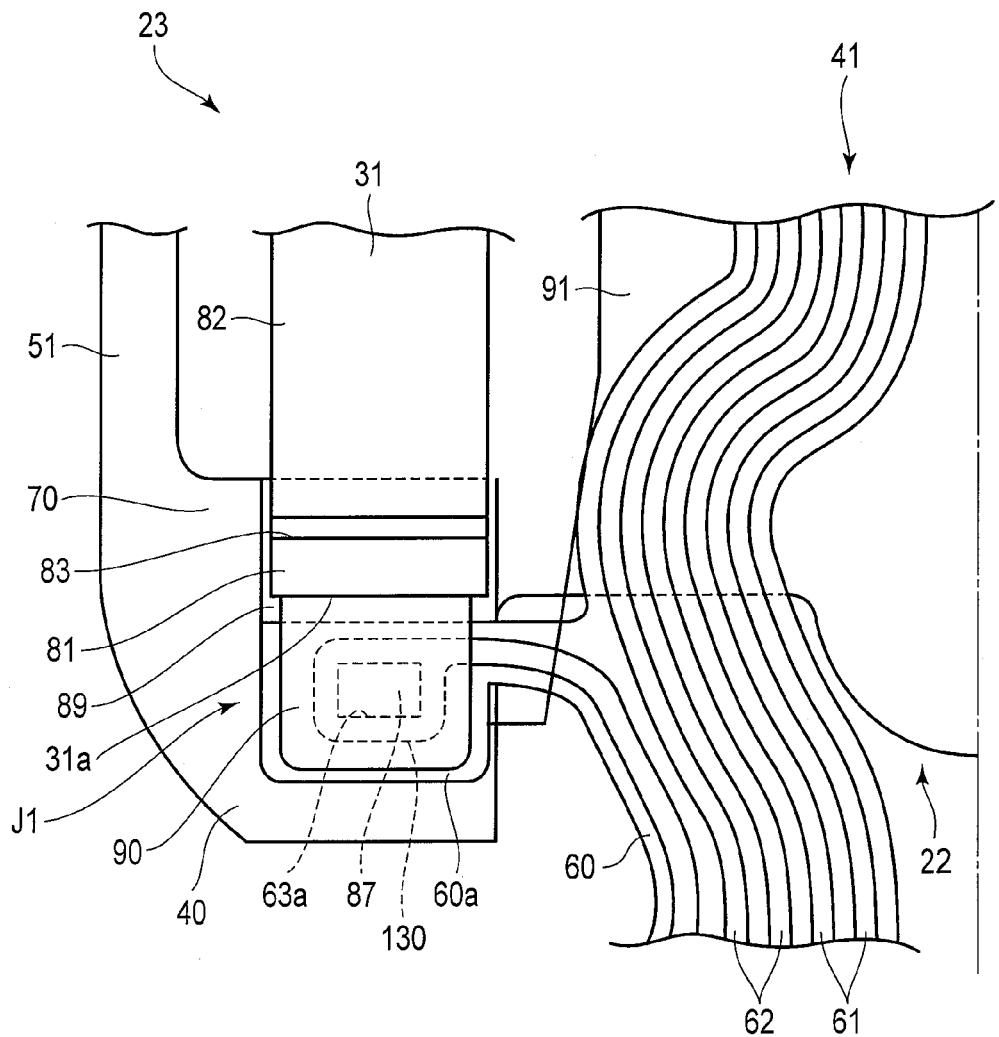
FIG. 10 is a plan view showing a first joint portion of the actuator mounting section of FIG. 4.

FIG. 8 shows cross-sections of joint portions J1 and J2 which serve to perform mechanical fixing and electrical connection of the two end portions 31a and 31b in a stroke direction of the actuator element 31. Arrow X3 in FIG. 8 indicates a longitudinal direction of the actuator element 31, that is, a direction in which the actuator element 31 extends and contracts (stroke direction). FIG. 10 is an enlarged view showing first joint portion J1 and its periphery. FIG. 11 is an enlarged view showing second joint portion J2 and its periphery. The conductive circuit portion 41 of FIGS. 10 and 11 are illustrated without the cover layer 63 (as shown in FIG. 7).

As shown in FIG. 8, the actuator element 31 comprises an element body 80 made of, for example, lead zirconate titanate (PZT), and a first electrode 81 and a second electrode 82 formed on a peripheral surface of the element body 80. The first electrode 81 is provided extending from the end surface 33 of the first end portion 31a to the lower surface 34. The second electrode 82 is provided extending from the end surface 35 of the second end portion 31b to the upper surface 36. Each of slits 83 and 84 for electrical insulation is formed between the first electrode 81 and the second electrode 82.

As shown in FIGS. 8 and 10, a first insulating layer 60a, which is a part of the insulating layer 60, is formed on the first supporting portion 70 of first joint portion J1. A first conductor 87 on a signal (positive) side is provided on the first insulating layer 60a. On the cover layer 63, a first opening 63a which exposes a part of an upper surface of the first conductor 87 is formed.

As shown in FIGS. 8 and 11, a second insulating layer 60b, which is a part of the insulating layer 60, is formed on the second supporting portion 72 of second joint portion J2. A second conductor 88 on a ground (negative) side is provided on the second insulating layer 60b. On the cover layer 63, a second opening 63b which exposes a part of an upper surface of the second conductor 88 is formed.

As shown in FIG. 8, the first end portion 31a of the actuator element 31 is secured to the metal base 40 of first joint portion J1 by means of an electrically insulating adhesive 89 of epoxy resin, for example. The second end portion 31b of the actuator element 31 is also secured to the metal base 40 of second joint portion J2 by the adhesive 89 of epoxy resin, etc.

At the first end surface 33 of the actuator element 31, the first electrode 81 and the first conductor 87 are disposed. An electrically conductive paste 90 is provided between the first electrode 81 and the first conductor 87. At the second end surface 35 of the actuator element 31, the second electrode 82 and the second conductor 88 are disposed. An electrically conductive paste 90 is also provided between the second electrode 82 and the second conductor 88.

An example of the electrically conductive paste 90 is a silver paste. The silver paste comprises a resin base which functions as an organic binder, and an abundance of conductive particles (silver particles) mixed into the resin base. When uncured silver paste is cured at room temperature or by heating, the conductive particles (silver particles) electrically contact each other. The electrically conductive paste 90 provided in first joint portion J1 serves as conduction means for electrical connection between the first electrode 81 and the first conductor 87 at the signal side. The electrically conductive paste 90 provided in second joint portion J2 serves as conduction means for electrical connection between the second electrode 82 and the second conductor 88 at the ground side. Note that the conductive paste 90 may be a solder paste.

As shown in FIGS. 5 and 6, the gimbal portion 30 of the flexure 22 comprises a first tongue portion 91 on a stationary side, a movable second tongue portion 92, and a hinge portion 93 formed between the first tongue portion 91 and the second tongue portion 92. The first tongue portion 91, the second tongue portion 92, and the hinge portion 93 are all part of the metal base 40, and constitute a tongue for mounting the slider 11 thereon. The second tongue portion 92 can be moved relative to the first tongue portion 91 in directions indicated by double-headed arrow A in FIG. 5.

A leading-side portion 11a of the slider 11 is disposed to be movable with respect to the first tongue portion 91. A trailing-side portion 11b of the slider 11 is secured to the second tongue portion 92. The "leading-side" here is intended as the side at which the air flows in between the slider 11 and the disk 4 when the disk 4 rotates. On the other hand, the "trailing-side" is intended as the side at which the air that entered between the slider 11 and the disk 4 comes out.

FIG. 9 is a cross-sectional view of a part of the load beam 21 and a part of the gimbal portion 30 taken at the hinge portion 93. A dimple 100 is formed on the load beam 21. The dimple 100 is an example of a supporting protrusion, and has a convex surface projecting toward the gimbal portion 30 of the flexure 22. As the top of the convex surface (distal end of the dimple 100) contacts the hinge portion 93, the slider 11 is swingably supported.

The actuator mounting section 23 is provided with limiter members 110 and 111. The limiter members 110 and 111 serve to prevent the tongue portions 91 and 92 from excessively swinging or the hinge portion 93 from moving away from the dimple 100 (dimple separation) when the suspension 10 is subjected to mechanical external shock. The limiter members 110 and 111 are formed of a resin (for example, polyimide), which is the same material as the insulating layer 60 (FIG. 7) of the conductive circuit portion 41.

FIG. 12 illustrates the slider terminal portion 41a. A terminal 11c provided on the slider 11 is connected to the slider terminal portion 41a via a conductive member 120 for bonding such as a gold ball. The slider terminal portion 41a comprises the insulating layer 60, the cover layer 63, a terminal conductor 121 made of copper, a base nickel layer 122, and a gold-plating layer 123. The base nickel layer 122 is formed on the terminal conductor 121. The gold-plating layer 123 is formed on the base nickel layer 122. A surface of the gold-plating layer 123 is not subjected to roughening treatment and is smooth.

The base nickel layer 122 is used as a base of the gold-plating layer 123. Thickness T1 (FIG. 12) of the base nickel layer 122 is, for example, 0.12 to 2.0 µm. A thickness of the gold-plating layer 123 is, for example, 0.5 to 1.5 µm. Peel strength of the base nickel layer 122 with respect to copper and peel strength of the gold-plating layer 123 with respect to the base nickel layer 122 are both significantly greater than that of the gold-plating layer 123 with respect to copper. For this reason, by interposing the base nickel layer 122 between the terminal conductor 121 made of copper and the gold-plating layer 123, the gold-plating layer 123 can be firmly adhered to the terminal conductor 121.

FIG. 13 illustrates a first terminal portion 130 provided at first joint portion J1. The first terminal portion 130 comprises the metal base 40, the first insulating layer 60a, the cover layer 63, the first conductor 87 on the signal side, a first terminal element 131, and a first gold-plating layer 132 in order from the bottom in FIG. 13. The first conductor 87 is made of copper. The first terminal element 131 is made of nickel. Thickness T2 (FIG. 13) of the first terminal element 131 is, for example, more than five times greater than thickness T1

(FIG. 12) of the base nickel layer 122. The first terminal element 131 is provided in the first opening 63a. The first opening 63a is formed in the cover layer 63. At an external end portion of the first terminal element 131, an overhang portion 131a which protrudes outwardly from the first opening 63a is formed.

A thick nickel-plating needs to be applied to the first terminal element 131. Accordingly, the first terminal element 131 is formed in a process different from the base nickel layer 122 (as shown in FIG. 12). Note that in performing the nickel-plating, the first terminal element 131 may be formed by plating after forming a base nickel layer 122, which is the same layer as that provided in the slider terminal portion 41a, on the first conductor 87. In this case, as shown in FIG. 13 by a two-dot chain line, the first terminal element 131 overlaps the base nickel layer 122 in a thickness direction thereof. Alternatively, after forming the first terminal element 131 by plating on the first conductor 87, the base nickel layer 122, which is the same layer as that provided in the slider terminal portion 41a, may be formed. In this case, the base nickel layer 122 is laid on top of the first terminal element 131.

A thickness of the first gold-plating layer 132 is, for example, 0.5 to 1.5 μm. On a surface of the first gold-plating layer 132, a first roughening processed portion 133 is formed. The first roughening processed portion 133 has the so-called texture structure having gritty properties. The first roughening processed portion 133 can be formed by providing a number of minute pits and projections on the surface of the first gold-plating layer 132 by a laser processing machine, for example. Alternatively, by one type of etching, a number of minute pits and projections may be formed on the surface of the first gold-plating layer 132 to roughen this surface.

In forming the first roughening processed portion 133 on the first gold-plating layer 132, when the power of a laser beam, for example, is too strong, a hole may be formed in the first gold-plating layer 132. The base nickel layer 122 of normal thickness (0.12 to 2.0 μm) is used for the slider terminal portion 41a shown in FIG. 12. In this case, since the base nickel layer 122 is thin, when a hole is formed in the gold-plating layer, the base nickel layer 122 will also have a hole and the copper of the terminal conductor 121 may be exposed. When the exposed copper is brought into contact with oxygen and moisture in the atmosphere, the copper is oxidized, causing deterioration of wettability of the electrically conductive paste 90.

Accordingly, in the case of the first terminal portion 130 of the embodiment shown in FIG. 13, the first terminal element 131 which is thick exists under the first gold-plating layer 132. Consequently, in forming the first roughening processed portion 133, even if the first roughening processed portion 133 is coarsened or a hole is formed, the hole does not reach the first terminal element 131. Accordingly, it is possible to prevent the copper of the first conductor 87 from being exposed to the first roughening processed portion 133.

That is, in this embodiment, the first terminal element 131 is provided between the first roughening processed portion 133 and the first conductor 87. The first terminal element 131 constitutes a first protection means for preventing a part of the copper of the first conductor 87 from being exposed to the first roughening processed portion 133. Moreover, since the first terminal element 131 is made of nickel, it is possible to firmly adhere the first terminal element 131 to both of the first conductor 87 and the first gold-plating layer 132.

In the first terminal portion 130, the electrically conductive paste (for example, the silver paste) 90 as shown in FIG. 8 is provided. On the surface of the first gold-plating layer 132 which is in contact with the electrically conductive paste 90, the first roughening processed portion 133 is provided. Accordingly, the electrically conductive paste 90 can be firmly adhered to the first gold-plating layer 132. Thus, peel strength of the electrically conductive paste 90 with respect to the first terminal portion 130 is improved, and good electrical conductivity can be obtained.

FIG. 14 illustrates a second terminal portion 140 provided at second joint portion J2. The second terminal portion 140 comprises the metal base 40, the second insulating layer 60b, the cover layer 63, the second conductor 88 on the ground side made of copper, a second terminal element 141 made of nickel, and a second gold-plating layer 142 in order from the bottom in FIG. 14. Thickness T3 (FIG. 14) of the second terminal element 141 is, for example, more than ten times greater than thickness T1 (FIG. 12) of the base nickel layer 122. The second terminal element 141 is provided in the opening 63b. The opening 63b is formed in the cover layer 63. At an external end portion of the second terminal element 141, an overhang portion 141a which protrudes outwardly from the opening 63b is formed.

As shown in FIG. 14, an opening 150 is formed in the second insulating layer 60b. The opening 150 accommodates a part of the second conductor 88. As the part of the second conductor 88 contacts the metal base 40, the second conductor 88 on the ground side is electrically connected to the metal base 40. A recess 151 is formed on the second conductor 88. The recess 151 accommodates a part of the second terminal element 141.

A thick nickel-plating needs to be applied to the second terminal element 141. Accordingly, the second terminal element 141 is formed in a process different from the base nickel layer 122 (as shown in FIG. 12). Note that in performing the nickel-plating, the second terminal element 141 may be formed by plating after forming a base nickel layer 122, which is the same layer as that provided in the slider terminal portion 41a, on the second conductor 88. In this case, as shown in FIG. 14 by a two-dot chain line, the second terminal element 141 overlaps the base nickel layer 122 in a thickness direction thereof. Alternatively, after forming the second terminal element 141 by plating on the second conductor 88, the base nickel layer 122, which is the same layer as that provided in the slider terminal portion 41a, may be formed. In this case, the base nickel layer 122 is laid on top of the second terminal element 141.

A thickness of the second gold-plating layer 142 is, for example, 0.5 to 1.5 μm. On a surface of the second gold-plating layer 142, a second roughening processed portion 143 is formed. The second roughening processed portion 143 has the so-called texture structure having gritty properties. The second roughening processed portion 143 can be formed by providing a number of minute pits and projections on the surface of the second gold-plating layer 142 by a laser processing machine, for example. Alternatively, by one type of etching, a number of minute pits and projections may be formed on the surface of the second gold-plating layer 142 to roughen this surface.

In forming the second roughening processed portion 143 on the second gold-plating layer 142, when the power of a laser beam, for example, is too strong, a hole may be formed in the second gold-plating layer 142. Thus, in the second terminal portion 140 shown in FIG. 14, the second terminal element 141 which is thick is provided under the second gold-plating layer 142. Consequently, in forming the second roughening processed portion 143, even if the second roughening processed portion 143 is coarsened or a hole is formed, the hole does not reach the second terminal element 141.

Accordingly, it is possible to prevent the copper of the second conductor 88 from being exposed to the second roughening processed portion 143.

That is, in this embodiment, the second terminal element 141 is provided between the second roughening processed portion 143 and the second conductor 88. The second terminal element 141 constitutes a second protection means for preventing a part of the copper of the second conductor 88 from being exposed to the second roughening processed portion 143. Moreover, since the second terminal element 141 is made of nickel, it is possible to firmly adhere the second terminal element 141 to both of the second conductor 88 and the second gold-plating layer 142.

In the second terminal portion 140, the electrically conductive paste (for example, the silver paste) 90 as shown in FIG. 8 is provided. On the surface of the second gold-plating layer 142 which is in contact with the electrically conductive paste 90, the second roughening processed portion 143 is provided. Accordingly, the electrically conductive paste 90 can be firmly adhered to the second gold-plating layer 142, and peel strength of the electrically conductive paste 90 with respect to the second terminal portion 140 is improved, so that good electrical conductivity can be obtained.

An operation of the suspension 10 will now be described.

If the carriage 6 (FIGS. 1 and 2) is turned by the positioning motor 7, the suspension 10 moves radially relative to the disk 4. In this way, the slider 11 of the magnetic head moves to a desired track of the recording surface of the disk 4. When a voltage is applied to the actuator elements 31 and 32, the actuator elements 31 and 32 are distorted in directions opposite to each other according to the voltage. The trailing-side portion 11b of the slider 11 is secured to the second tongue portion 92. The leading-side portion 11a of the slider 11 is movable relative to the first tongue portion 92. Thus, when the actuator elements 31 and 32 are distorted in directions opposite to each other, the second tongue portion 92 is moved relative to the first tongue portion 91 in a lateral direction of the slider 11 with the hinge portion 93 serving as the border. In this way, the slider 11 can be moved by an infinitesimal distance in the sway direction (indicated by arrow Y in FIG. 3).

FIG. 15 illustrates a terminal portion 130A according to a second embodiment. The terminal portion 130A comprises a metal base 40, a first insulating layer 60a, a first conductor 87 on a signal side, a first terminal element 131 made of nickel, and a first gold-plating layer 132. On a surface of the gold-plating layer 132, a first roughening processed portion 133 is formed. The terminal portion 130 does not include the cover layer 63 of the first terminal portion 130 (FIG. 13) of the first embodiment. Since the other structures and the effect have commonalities with the first terminal portion 130 of the first embodiment, common reference numerals are added to designate the common elements and their explanations will be omitted.

Figure 16:
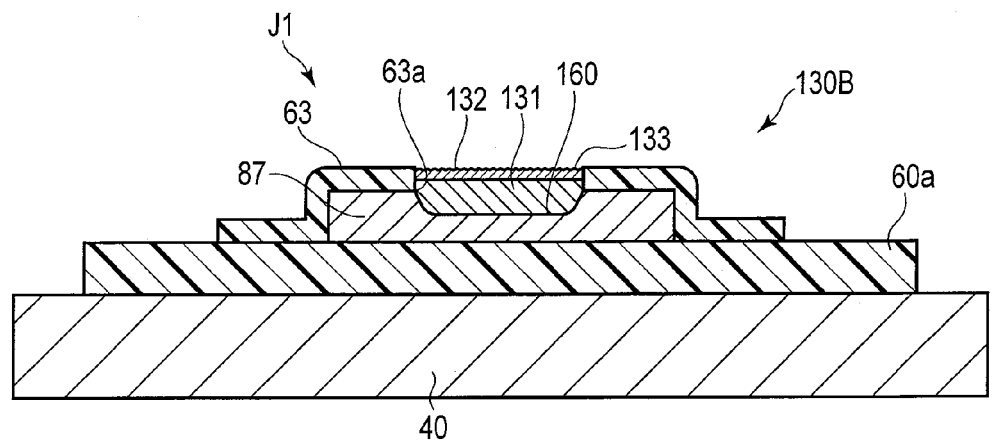
FIG. 16 is a cross-sectional view of a first terminal portion of an actuator mounting section according to a third embodiment.

FIG. 16 illustrates a terminal portion 130B according to a third embodiment. The terminal portion 130B comprises a metal base 40, a first insulating layer 60a, a first conductor 87 on a signal side, a first terminal element 131 made of nickel, and a first gold-plating layer 132. On a surface of the gold-plating layer 132, a first roughening processed portion 133 is formed. An opening 63a is formed in a cover layer 63 which covers the first conductor 87. At the interior of the opening 63a, the first terminal element 131 and the first gold-plating layer 132 comprising the first roughening processed portion 133 are provided. Further, a recess 160 is formed on the first conductor 87, and the recess 160 accommodates a part of the first terminal element 131. Since the other structures and the effect have commonalities with the first terminal portion 130 of the first embodiment, common reference numerals are added to designate the common elements and their explanations will be omitted.

Figure 17:
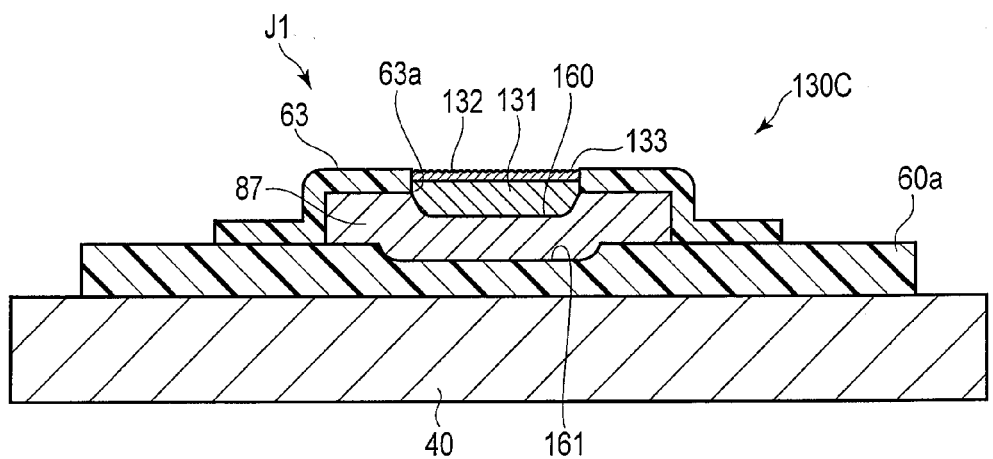
FIG. 17 is a cross-sectional view of a first terminal portion of an actuator mounting section according to a fourth embodiment.

FIG. 17 illustrates a terminal portion 130C according to a fourth embodiment. The terminal portion 130C comprises a recess 161 formed on a first insulating layer 60a, and the recess 161 accommodates a part of a first conductor 87. Since the other structures and the effect have commonalities with the terminal portion 130B of the third embodiment shown in FIG. 16, common reference numerals are added to designate the common elements and their explanations will be omitted.

Figure 18:
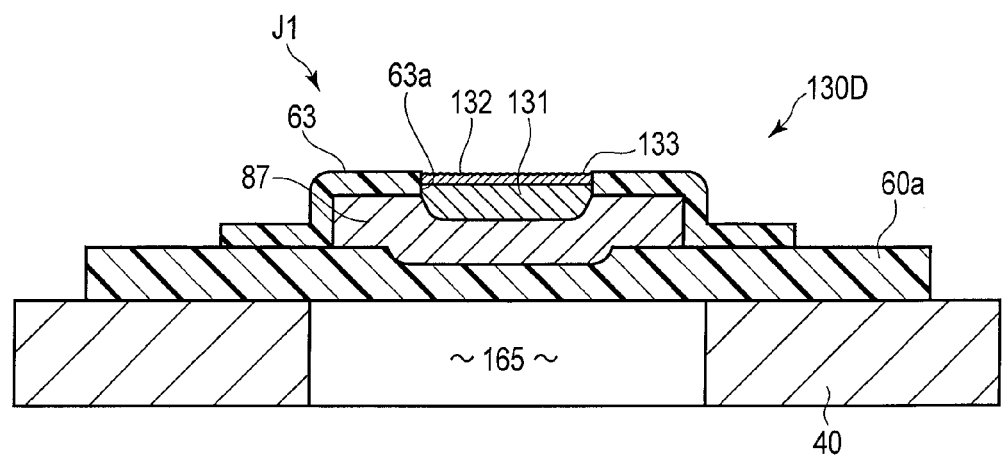
FIG. 18 is a cross-sectional view of a first terminal portion of an actuator mounting section according to a fifth embodiment.

FIG. 18 illustrates a terminal portion 130D according to a fifth embodiment. The terminal portion 130D comprises, at a part of a metal base 40, that is, at a place below a conductor 87, an opening 165. Since the other structures and the effect have commonalities with the terminal portion 130C of the fourth embodiment shown in FIG. 17, common reference numerals are added to designate the common elements and their explanations will be omitted.

Figure 19:
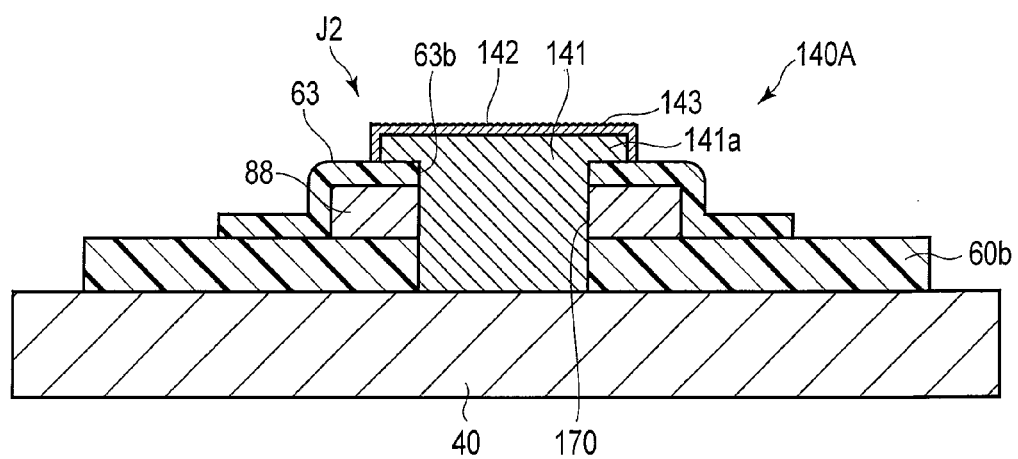
FIG. 19 is a cross-sectional view of a second terminal portion of an actuator mounting section according to a sixth embodiment.

FIG. 19 illustrates a terminal portion 140A according to a sixth embodiment. The terminal portion 140A comprises a through-hole 170 formed at a place extending through a second insulating layer 60b and a second conductor 88. The through-hole 170 accommodates a second terminal element 141, and a distal end of the second terminal element 141 contacts a metal base 40. Since the other structures and the effect have commonalities with the terminal portion 140 of the first embodiment shown in FIG. 14, common reference numerals are added to designate the common elements and their explanations will be omitted.

FIG. 20 illustrates a terminal portion 140B according to a seventh embodiment. The terminal portion 140B comprises, at the interior of an opening 63b formed in a cover layer 63, a second terminal element 141, and a second gold-plating layer 142 comprising a roughening processed portion 143. Since the other structures and the effect have commonalities with the terminal portion 140A of the sixth embodiment shown in FIG. 19, common reference numerals are added to designate the common elements and their explanations will be omitted.

FIG. 21 illustrates a terminal portion 140C according to an eighth embodiment. The terminal portion 140C comprises an opening 150 formed in a second insulating layer 60b. The opening 150 accommodates a part of a second conductor 88. As a lower end of the second conductor 88 contacts a metal base 40, the second conductor 88 on the ground side is electrically connected to the metal base 40. Further, a recess 151 is formed on the second conductor 88, and the recess 151 accommodates a part of a second terminal element 141. Since the other structures and the effect have commonalities with the terminal portion 140B of the seventh embodiment shown in FIG. 20, common reference numerals are added to designate the common elements and their explanations will be omitted.

FIG. 22 illustrates a terminal portion 140D according to a ninth embodiment. The terminal portion 140D comprises a second terminal element 141 in an opening 150 formed in a second insulating layer 60b. At an end of the second terminal element 141, a second gold-plating layer 142 comprising a roughening processed portion 143 is provided. The other end of the second terminal element 141 contacts a metal base 40.

FIG. 23 illustrates a terminal portion 140E according to a tenth embodiment. The terminal portion 140E comprises a circular opening 150 formed in a second insulting layer 60b, and a circular opening 180 formed in a metal base 40. At the interior of the openings 150 and 180, a second terminal element 141 having a columnar shape is accommodated. The second terminal element 141 is in contact with the metal base 40 and a conductor 88. At an end of the second terminal element 141, a second gold-plating layer 142 comprising a second roughening processed portion 143 is provided. An electrically conductive paste 90 (as shown in FIG. 8) contacts the second roughening processed portion 143.

Needless to say, it should be noted that in addition to a specific structure of the suspension comprising actuator elements, a specific form of each constituent element of the terminal portion, such as the metal base, insulating layer, conductor, terminal element, gold-plating layer, and electrically conductive paste of the flexure, can be modified variously in implementing the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
a load beam;
a flexure comprising a metal base secured to the load beam, and a slider mounted thereon;
actuator elements configured to displace the slider;
a slider terminal portion which is electrically connected to a terminal of the slider;
a first terminal portion which is electrically connected to a first electrode of the actuator elements via an electrically conductive paste; and
a second terminal portion which is electrically connected to a second electrode of the actuator elements and via an electrically conductive paste;
wherein the slider terminal portion comprises a terminal conductor made of copper, a base nickel layer formed on the terminal conductor, and a gold-plating layer formed on the base nickel layer;
wherein the first terminal portion comprises a first insulating layer having an electrical insulating property provided on the metal base, a first conductor made of copper which is formed on the first insulating layer, a first terminal element made of nickel which is provided on the first conductor and has a thickness greater than the base nickel layer, and a first gold-plating layer which is formed on the first terminal element and comprises a first roughening processed portion on its surface, and the first terminal element disposed between the first roughening processed portion and the first conductor constitutes a first protection means for preventing a part of copper of the first conductor from being exposed to the first roughening processed portion;
wherein the first terminal portion comprises a cover layer having an electrical insulating property which covers the first conductor, the cover layer comprising a first opening; and
wherein the first terminal element and the first gold-plating layer comprising the first roughening processed portion are provided at a position corresponding to the first opening.

2. The disk drive suspension according to claim 1, wherein the second terminal portion comprises a second insulating layer having an electrical insulating property provided on the metal base, a second conductor made of copper which is formed on the second insulating layer, a second terminal element made of nickel which is provided on the second conductor and has a thickness greater than the base nickel layer, and a second gold-plating layer which is formed on the second terminal element and comprises a second roughening processed portion on its surface, and the second terminal element disposed between the second roughening processed portion and the second conductor constitutes a second protection means for preventing a part of copper of the second conductor from being exposed to the second roughening processed portion.

3. The disk drive suspension according to claim 2, wherein the second terminal portion comprises a cover layer having an electrical insulating property which covers the second conductor, and
the second terminal element and the second gold-plating layer comprising the second roughening processed portion are provided at an interior of a second opening formed in the cover layer.

4. The disk drive suspension according to claim 1, wherein the first terminal portion comprises the first terminal element in the first opening formed in the cover layer, and includes a first overhang portion which protrudes outwardly from the first opening at a part of the first terminal element.

5. The disk drive suspension according to claim 2, wherein the second terminal portion comprises a cover layer having an electrical insulating property which covers the second conductor, and
the second terminal portion comprises the second terminal element in a second opening formed in the cover layer, and includes an overhang portion which protrudes outwardly from the second opening at a part of the second terminal element.

6. The disk drive suspension according to claim 2, wherein the second insulating layer comprises an opening, and the second conductor contacts the metal base such that a part of the second conductor is confined within the opening.

7. The disk drive suspension according to claim 1, wherein the first conductor comprises a recess, and the recess accommodates a part of the first terminal element.

8. The disk drive suspension according to claim 2, wherein the second conductor comprises a recess, and the recess accommodates a part of the second terminal element.

9. The disk drive suspension according to claim 1, wherein the first insulating layer comprises a recess, and the recess accommodates a part of the first conductor.

10. The disk drive suspension according to claim 2, wherein a through-hole is formed at a place extending through the second insulating layer and the second conductor, the through-hole accommodates the second terminal element, and the second terminal element contacts the metal base.

11. The disk drive suspension according to claim 1, wherein a second base nickel layer, which is a layer of the same material as the base nickel layer of the slider terminal portion, overlaps the first terminal element.

12. The disk drive suspension according to claim 2, wherein another base nickel layer, which is a layer of the same material as the base nickel layer of the slider terminal portion, overlaps the second terminal element.

* * * * *